Aug. 9, 1932.  F. MINUTILLI  1,870,782
TRAP FOR ICE FISHING
Filed Jan. 20, 1932  2 Sheets-Sheet 2
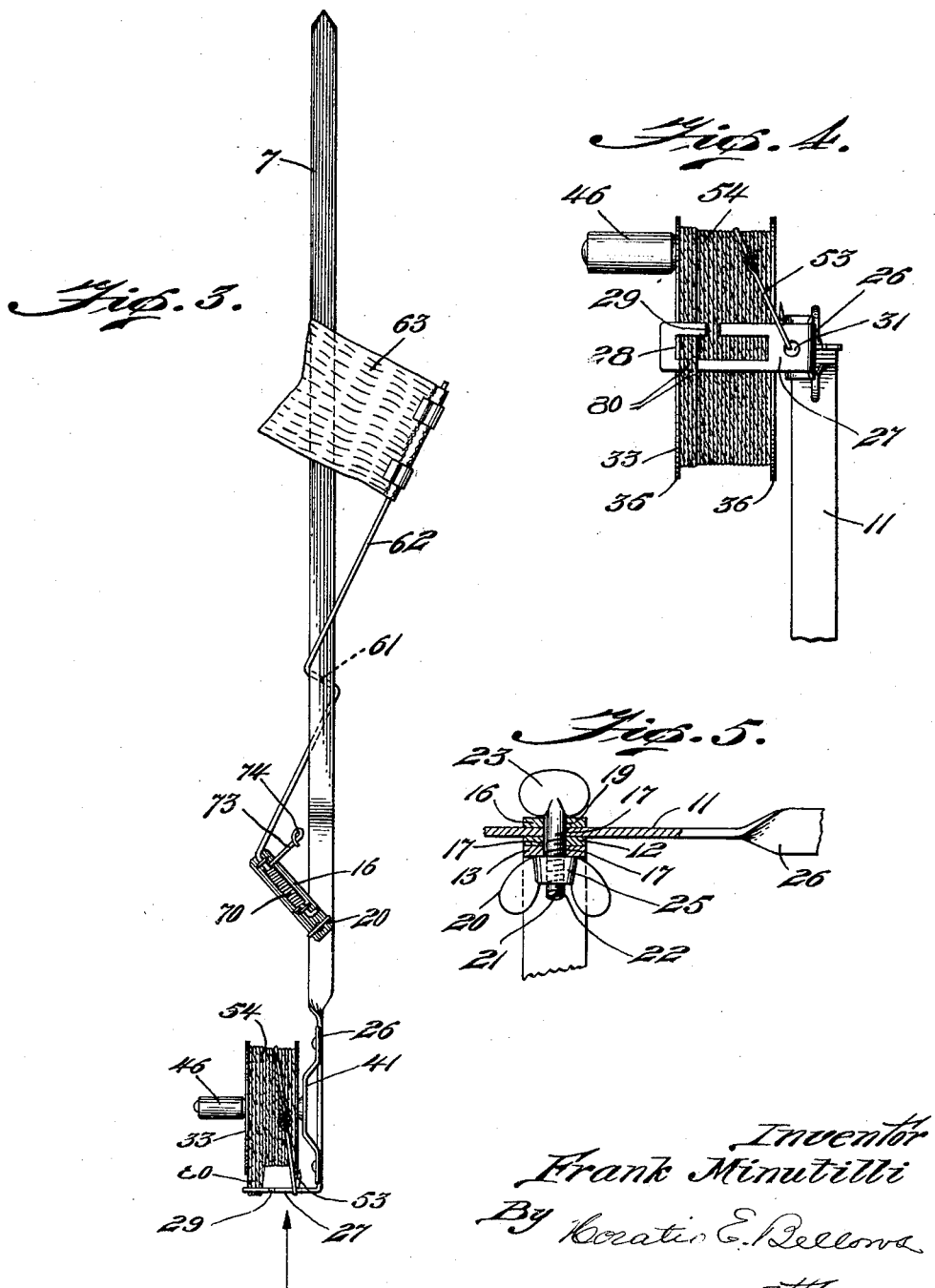
Inventor
Frank Minutilli
By Horatio E. Bellows
Attorney Patented Aug. 9, 1932

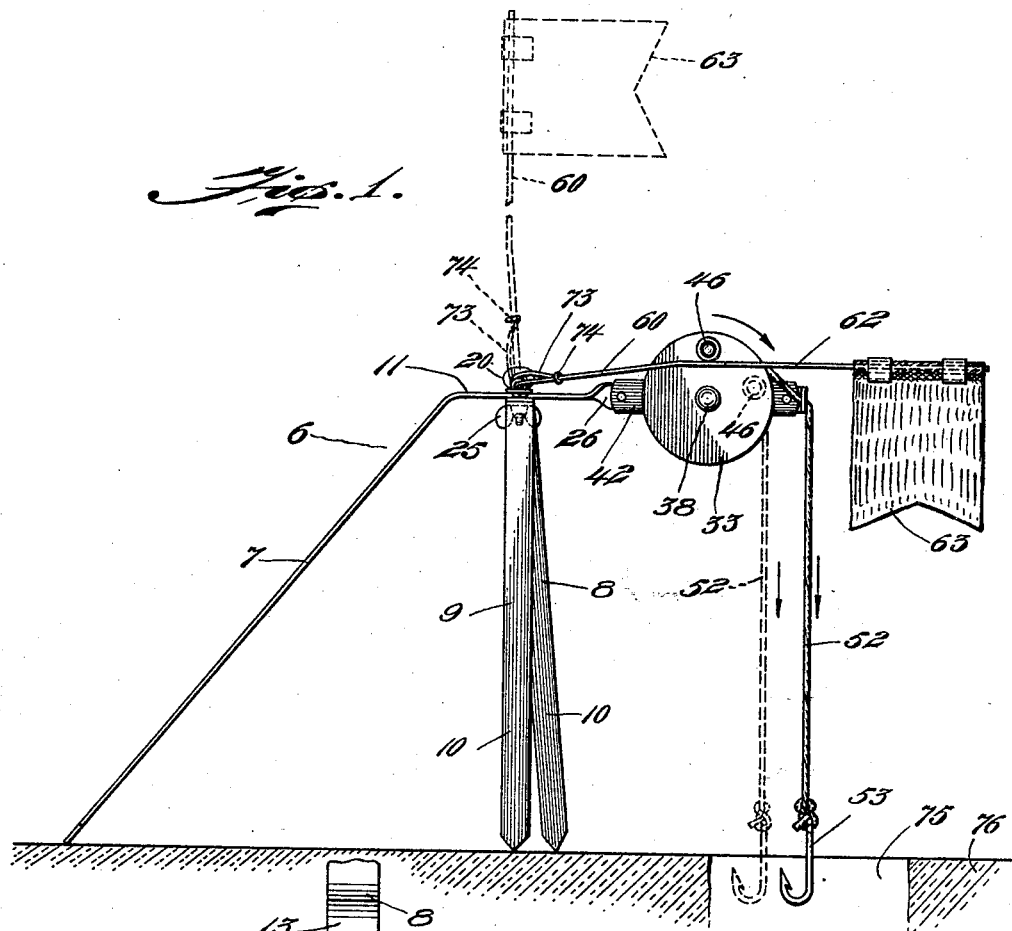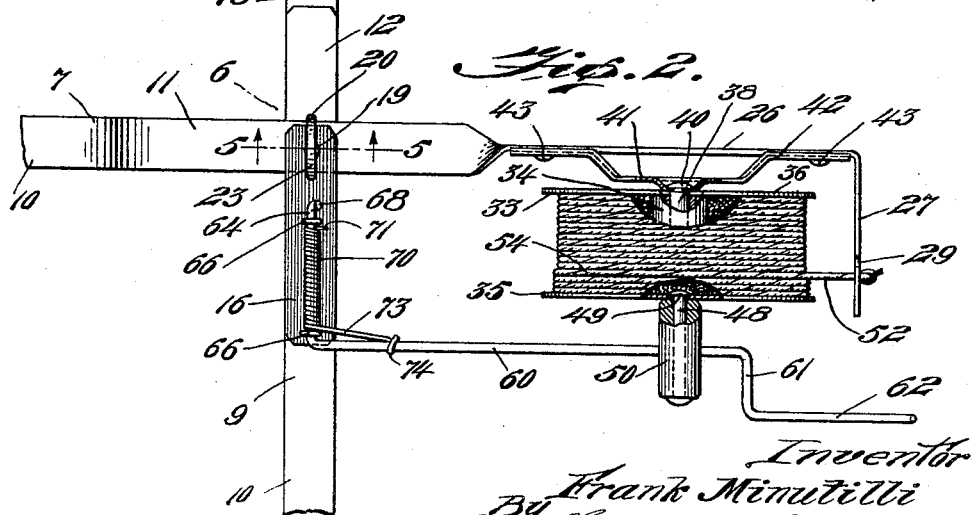

1,870,782

UNITED STATES PATENT OFFICE

FRANK MINUTILLI, OF HARRISVILLE, RHODE ISLAND

TRAP FOR ICE FISHING

Application filed January 20, 1932. Serial No. 587,637.

My invention relates to ice fishing traps commonly known as tilts.

The essential objects of my invention are compactness, portability, facility of adjustment, certainty and speed of operation, and inexpensiveness of construction.

To the above ends primarily, but not exclusively, my invention consists in such parts and in such combinations of parts as fall within the scope of the appended claims.

In the accompanying drawings which form a part of this specification,

Figure 1 is a front elevation of my device arranged upon the ice with the signal arm in engaged or set position, Figure 2, a fragmentary plan view of the same, Figure 3, a plan view of my device in folded position, Figure 4, a fragmentary end elevation of the latter as viewed in the direction of the arrow in Figure 3, and Figure 5, an enlarged section on line 5—5 of Figure 2.

Similar characters of reference indicate similar parts throughout the views.

As shown a stand 6 includes three legs 7, 8, and 9, each having upwardly inclined lower portions 10, and flat top portions 11, 12, and 13 respectively lying in horizontal planes. A flat swinging carrier plate 16 rests on the extension 11. Intermediate the length of each of the three upper portions are perforations 17 registering with each other, as shown in Figure 5. Near one end the plate 16 is provided with a perforation 19. A clamping member 20 includes a screw shank 21 provided with a thread 22 traversing the perforations 17 and 19, having a disk head 23 engageable with the plate 16, and a thumb nut 25 engaging the shank thread and the lowermost leg portion 13.

Integral with the portion 11 of the central and upper leg 7 is an extension arm 26, vertical in cross section, terminating in a rectangularly disposed integral guide plate 27 provided, as shown in Figure 4, with an oblong rectangular longitudinally disposed opening 28 and with a vertical slot 29 extending from the center of the opening to the top edge of the plate. Adjacent the opening in the latter is a hole 31.

Pivotally supported upon the extension arm 26 is a line reel 33 including the usual drum 34, front and back heads 35 and 36, and shaft 38 upon which the drum is pivotally mounted. The end of the shaft 38 is riveted, as at 40, to the elevated intermediate portion 41 of a bearing plate 42 fixed by rivets 43 to the bracket arm 26. The handle 46 of the reel comprises a pin 48 riveted, as at 49 to the margin of the front plate 35, and a roller 50 upon the pin. A line 52 to whose end is attached a hook 53 is disposed in a coil 54 upon the drum of the reel.

The plate 16 carries the signal mechanism which in detail includes a signal arm 60 provided with a lateral shoulder 61 intermediate its length so that the free end portion 62 of the arm is offset, and has fixed to its free end a signal flag 63. The arm 60 is formed from a length of wire and is laterally or right angularly bent at its inner end to form an integral rock shaft 64 journaled in spaced eyes or bearings 66 arranged longitudinally of the plate 16 to which the bearings are fixed. Upon the extremity of the shaft 64 is a lateral inclined stop finger 68 adapted to cooperate with the plate to limit the vertical travel of the arm 60 to a vertical position. A helical spring 70 surrounding the rock shaft 64 has upon one end a terminal stop finger 71 bearing against the plate 16, while the other end of the spring terminates in an upwardly directed spring arm 73 having a terminal open loop or hook 74 detachably engaging the signal arm 60.

In order to set my device the plate 16 is by means of the clamping member 20 adjusted to a position at right angles to the arm extension 26 and parallel to the handle 46. Then the signal arm is manually depressed against the action of the spring arm 73 to a substantially horizontal position below the reel handle 46, the reel being for this purpose temporarily swung to bring the handle 46 into the dotted position shown in Figure 1. After the handle has been returned to the full line position the signal arm upwardly presses against the lower portion of the handle at a point near the shoulder 61. The line 52 is preferably passed downwardly through the slot 29 and through the opening 28 of the guide plate and depends the desired length into the hole 75 in the ice 76 as indicated in full lines in Figure 1.

In case a fish seizes the hook the reel is moved thereby in the direction of the arrow in Figure 1 which moves the handle over and beyond the shoulder 61, thus releasing the signal rod, which is immediately impelled by the arm 73 to the vertical signaling position shown in broken lines in Figure 1.

When a fish has been manually drawn up there is often upon the ice irregular coils of many yards of line resting upon the ice that it is desirable to straighten in order to prevent irreparable tangling. This is effected by manually rotating the reel to draw the line up through the opening 28 of the guide plate 27. The plate thus not only removes the loops but also assists in laying the line smoothly upon the reel.

The line 52 may, as shown in broken lines in Figure 1, depend directly from the reel out of contact with the guide, but in such case a portion only of the advantages incident to my invention are attained.

To disassemble the parts the clamping member 20 is loosened, and the legs 8 and 9 swung into alignment with the leg 7, and the plate 60 swung at an acute angle to the legs. The signal arm 60 is manually detached from the loop 74 of the arm 73 and folded down upon the arm 7, the offset shoulder 61 only passing below the assembled legs and thus serving to clasp the remainder of the arm to the legs. The member 20 is now tightened to clamp the described parts in folded position.

To complete the packaging operation it is desirable to securely and safely dispose of the hook 53, and to maintain the reel 33 against rotation whereby the coiled line would become loose and tangled. To these ends, as shown in Figures 3 and 4, one or more of the final loops 80 of the line coil 54 are wound downwardly through the slot 29 and downwardly and laterally through the opening 28 over the lower margin of the guide plate 27 and back against the coil 54 which binds the reel against rotation in either direction. The barb of the hook 53 is passed through the hole 31 in a rearward direction where it is retained against escape and guarded by the parts 26 and 27.

I claim:—

1. In a trap for ice fishing, legs comprising inclined lower portions and pivotally interengaging top portions, a carrier plate, pivotally supported at one end by said top portions, an extension arm integral with one of the top portions, a reel pivotally supported by the arm, a handle upon the reel, a signal arm pivotally supported by the carrier plate, and a spring upon the plate for upwardly pressing the arm into contact with the handle, said signal arm being movable from engagement when the reel is rotated.

2. In a trap for ice fishing, a plurality of supporting legs including horizontally disposed interengaging top portions, a carrier plate upon the top portions, said top portions being provided with perforations registering with each other, and said plate being provided at one end with a perforation registering with the first perforations, a clamping screw traversing all the perforations, a clamping nut upon the screw, an extension arm continuous with one of the top portions, a reel pivotally supported by the arm, a handle on the reel, a depressible signal arm pivotally supported upon the plate normally detained by the handle and releasable from the handle by the rotation of the reel.

3. In a trap for ice fishing, a foldable stand, an extension arm supported upon the top of the stand, a pivotal carrier plate horizontally disposed upon the stand and disposed at right angles to the arm, a reel pivotally carried by the arm, a handle upon the reel, and an upwardly tensioned signal arm pivotally supported by the plate comprising a portion normally in engagement with the handle, and an offset portion out of the path of travel of the handle when the reel is rotated.

4. In a trap for ice fishing, a foldable stand, an extension arm carried by the stand, a carrier plate pivotally mounted at one end upon the stand at right angles to the arm, a reel pivotally supported by the arm, a handle on the reel, spaced bearings on the plate and disposed longitudinally thereof, a rock shaft mounted in the bearings, a stop finger on the rear end of the shaft and a signal arm integral with the front end of the shaft and provided with an offset intermediate its length, a helical spring surrounding the shaft and engageable at one end with the plate, a bracing arm upon the other end of the spring detachably engaging the signal arm, said signal arm being engageable with the handle in one position of the reel, and being releasable therefrom by the passage of the arm through the offset when the reel is circularly moved.

5. In a trap for ice fishing, legs including pivotally interengaging horizontally disposed top portions, a horizontal carrier plate pivotally supported by the top portions, an extension arm integral with one of the top portions, a reel pivotally supported upon the arm, a handle on the reel, a guide plate upon the arm and disposed at right angles thereto adjacent the periphery of the reel, said guide plate being provided with an opening in its intermediate portion and with a vertical slit extending to the opening, and a signal arm pivotally supported by the carrier plate detachably engaging the handle.

6. In a trap for ice fishing, a foldable stand, an extension arm carried by the stand, a carrier plate supported by the stand adjacent the arm, a reel pivotally supported upon the arm, a handle on the reel, a guide plate upon the arm disposed transversely of the reel adjacent the periphery of the reel, said guide plate being provided with an oblong horizontal opening, and with a vertical marginal slit communicating therewith, and with a hole near the opening, and a signal arm pivotally supported by the carrier plate detachably engageable with the handle.

In testimony whereof I have affixed my signature.

FRANK MINUTILLI.